US012597636B2

(12) United States Patent
Yang et al.

(10) Patent No.: US 12,597,636 B2
(45) Date of Patent: Apr. 7, 2026

(54) SOLID-STATE COMPOSITE POLYMER ELECTROLYTE MEMBRANE AND ALL-SOLID-STATE LITHIUM ION BATTERY INCLUDING THE SAME

(71) Applicant: Ming Chi University of Technology, New Taipei City (TW)

(72) Inventors: Chun-Chen Yang, New Taipei City (TW); Yi-Shiuan Wu, New Taipei City (TW); Hoai-Khang Tran, New Taipei City (TW)

(73) Assignee: Ming Chi University of Technology, New Taipei City (TW)

( * ) Notice: Subject to any disclaimer, the term of this patent is extended or adjusted under 35 U.S.C. 154(b) by 644 days.

(21) Appl. No.: 18/189,724

(22) Filed: Mar. 24, 2023

(65) Prior Publication Data

US 2023/0420727 A1 Dec. 28, 2023

(30) Foreign Application Priority Data

Jun. 27, 2022 (TW) .................................. 111123910

(51) Int. Cl.
*H01M 10/056* (2010.01)
*H01M 10/0525* (2010.01)

(52) U.S. Cl.
CPC ..... *H01M 10/056* (2013.01); *H01M 10/0525* (2013.01); *H01M 2300/0071* (2013.01); *H01M 2300/0082* (2013.01)

(58) Field of Classification Search
None
See application file for complete search history.

(56) References Cited

U.S. PATENT DOCUMENTS

2023/0109953 A1* 4/2023 Jang ...................... H01M 4/623
429/322

FOREIGN PATENT DOCUMENTS

| CN | 112786951 A | 5/2021 |
| CN | 114335710 A | 4/2022 |
| TW | I756162 B | 2/2022 |

OTHER PUBLICATIONS

Search Report appended to an Office Action, which was issued to Taiwanese counterpart application No. 111123910 by the TIPO on Jul. 22, 2022, with an English translation thereof.

* cited by examiner

*Primary Examiner* — Nathanael T Zemui

(74) *Attorney, Agent, or Firm* — Ohlandt, Greeley and Perle, LLP.

(57) ABSTRACT

Disclosed herein is a solid-state composite polymer electrolyte membrane including a solid-state electrolyte layer and a cured electrolyte layer disposed thereon. The solid-state electrolyte layer includes poly(vinylidene fluoride-co-hexafluoropropylene), lithium bis(trifluoromethanesulfonyl) imide, succinonitrile, and aluminum-doped lithium lanthanum zirconium oxide that is present from 50 wt % to 80 wt % based on 100 wt % of the solid-state electrolyte layer. The first cured electrolyte layer is formed by subjecting a first composition including a first initiator and a first component that includes an acrylic material, lithium bis(trifluoromethanesulfonyl)imide and succinonitrile to a first polymerization reaction. The acrylic material is selected from ethoxylated trimethylolpropane triacrylate, poly(ethylene glycol) dimethacrylate, poly(ethylene glycol) methacrylate, and combinations thereof. An all-solid-state lithium ion battery including the solid-state composite polymer electrolyte membrane is also disclosed.

11 Claims, No Drawings

SOLID-STATE COMPOSITE POLYMER ELECTROLYTE MEMBRANE AND ALL-SOLID-STATE LITHIUM ION BATTERY INCLUDING THE SAME

CROSS-REFERENCE TO RELATED APPLICATION

This application claims priority to Taiwanese Invention Patent Application No. 111123910, filed on Jun. 27, 2022.

FIELD

The present disclosure relates to a solid-state electrolyte membrane, and more particularly to a solid-state composite polymer electrolyte membrane. The present disclosure also relates to an all-solid-state lithium ion battery including the solid-state composite polymer electrolyte membrane.

BACKGROUND

Lithium ion battery has been widely used in electronic products and electric vehicles for supplying power and storing energy. However, use of liquid electrolyte in the lithium ion battery has safety issue, such as easy formation of lithium dendrites, causing short circuit and electrolyte leakage, which can be effectively avoided by using solid electrolyte.

Chinese Invention Patent Application Publication No. CN 101124693 A discloses a lithium ion battery including a solid-state dual-layer polymer electrolyte, i.e., an N-layer and a P-layer each including poly(vinylidene fluoride-co-hexafluoropropylene) and lithium bis(trifluoromethanesulfonyl)imide.

Sandugash Kalybekkyzy et al., in an article entitled "Fabrication of UV-Crosslinked Flexible Solid Polymer Electrolyte with PDMS for Li-Ion Batteries" published in Polymers, 2021, Vol. 13(1), p. 15, discloses a solid-state electrolyte polymer membrane that is formed by subjecting a composition including poly(ethylene glycol) diacrylate, trimethylolpropane ethoxylate triacrylate, lithium bis(trifluoromethane sulfonyl)imide, polydimethylsiloxane, solvent and photoinitiator to a photocuring reaction.

Although the aforesaid solid-state dual-layer polymer electrolyte and the solid-state electrolyte polymer membrane could solve the problems of short circuit and electrolyte leakage in lithium ion battery, such solid-state electrolytes still has the problem of poor lithium ion conductivity.

SUMMARY

Therefore, in a first aspect, the present disclosure provides a solid-state composite polymer electrolyte membrane which can alleviate at least one of the drawbacks of the prior art.

The solid-state composite polymer electrolyte membrane includes a solid-state electrolyte layer and a first cured electrolyte layer. The solid-state electrolyte layer includes poly(vinylidene fluoride-co-hexafluoropropylene), lithium bis(trifluoromethanesulfonyl)imide, succinonitrile, and aluminum-doped lithium lanthanum zirconium oxide. The aluminum-doped lithium lanthanum zirconium oxide is present in an amount ranging from 50 wt % to 80 wt % based on 100 wt % of the solid-state electrolyte layer. The first cured electrolyte layer is disposed on the solid-state electrolyte layer, and is formed by subjecting a first composition including a first initiator and a first component that includes an acrylic material, lithium bis(trifluoromethanesulfonyl) imide and succinonitrile to a first polymerization reaction. The acrylic material is selected from the group consisting of ethoxylated trimethylolpropane triacrylate, poly(ethylene glycol) dimethacrylate, poly(ethylene glycol) methacrylate, and combinations thereof.

In a second aspect, the present disclosure provides an all-solid-state lithium ion battery which can alleviate at least one of the drawbacks of the prior art.

The all-solid-state lithium ion battery includes an anode, a cathode, and the abovementioned solid-state composite polymer electrolyte membrane which is disposed between the anode and the cathode.

DETAILED DESCRIPTION

Before the present disclosure is described in greater detail, it should be noted that if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

The present disclosure provides a solid-state composite polymer electrolyte membrane including a solid-state electrolyte layer and a first cured electrolyte layer. The solid-state electrolyte layer includes poly(vinylidene fluoride-co-hexafluoropropylene), lithium bis(trifluoromethanesulfonyl) imide, succinonitrile, and aluminum-doped lithium lanthanum zirconium oxide. The first cured electrolyte layer is disposed on the solid-state electrolyte layer, and is formed by subjecting a first composition including a first initiator and a first component that includes an acrylic material, lithium bis(trifluoromethanesulfonyl)imide and succinonitrile to a first polymerization reaction. The acrylic material of the first component is selected from the group consisting of ethoxylated trimethylolpropane triacrylate, poly(ethylene glycol) dimethacrylate, poly(ethylene glycol) methacrylate, and combinations thereof.

<<Solid-State Electrolyte Layer>>

In certain embodiments, the poly(vinylidene fluoride-co-hexafluoropropylene) is present in an amount ranging from 5 wt % to 70 wt % based on based on 100 wt % of the solid-state electrolyte layer. When the poly(vinylidene fluoride-co-hexafluoropropylene) is present in an amount greater than 5 wt % based on 100 wt % of the solid-state electrolyte layer, the solid-state electrolyte layer has good membrane-forming properties and good flexibility, so that the solid-state electrolyte layer easily forms the solid-state composite polymer electrolyte membrane which will not break easily. When the poly(vinylidene fluoride-co-hexafluoropropylene) is present in an amount less than 70 wt % based on 100 wt % of the solid-state electrolyte layer, the solid-state composite polymer electrolyte membrane has good lithium ion conductivity.

In certain embodiments, the lithium bis(trifluoromethanesulfonyl)imide is present in an amount ranging from 5 wt % to 70 wt % based on based on 100 wt % of the solid-state electrolyte layer. When the lithium bis(trifluoromethanesulfonyl)imide is present in an amount greater than 5 wt % based on 100 wt % of the solid-state electrolyte layer, the solid-state composite polymer electrolyte membrane has good lithium ion conductivity. When the lithium bis(trifluoromethanesulfonyl)imide is present in an amount less than 70 wt % based on 100 wt % of the solid-state electrolyte layer, the problem of lithium bis(trifluoromethanesulfonyl)imide cannot be completely dissolved due to its excessive amount can be avoided, and the problem of lithium bis(trifluoromethanesulfonyl)imide absorbing moisture to generate by-products, such as lithium hydroxide and lithium carbonate, which would adversely affect the lithium ion conductivity of the solid-state composite polymer electrolyte membrane, can also be avoided.

In order to allow the solid-state electrolyte layer to have good softness, good elasticity, and good flexibility, and to allow the lithium bis(trifluoromethanesulfonyl)imide to dissociate so as to generate sufficient lithium ions, thereby improving the lithium ion conductivity of the solid-state composite polymer electrolyte membrane, in certain embodiments, the succinonitrile is present in an amount ranging from greater than 0 wt % to less than 40 wt % based on 100 wt % of the solid-state electrolyte layer.

In order to allow the solid-state electrolyte layer to have good membrane-forming properties and good flexibility, so that the solid-state electrolyte layer easily forms the solid-state composite polymer electrolyte membrane which will not break easily and which has good lithium ion conductivity, in certain embodiments, the aluminum-doped lithium lanthanum zirconium oxide is present in an amount ranging from greater than 0 wt % to less than 80 wt % based on 100 wt % of the solid-state electrolyte layer. In order to allow the solid-state composite polymer electrolyte membrane to have good thermal stability, and at the same time, to improve the mechanical strength of the solid-state composite polymer electrolyte membrane so as to inhibit formation of lithium dendrites thereon, in certain embodiments, based on 100 wt % of the solid-state electrolyte layer, the aluminum-doped lithium lanthanum zirconium oxide is present in an amount ranging from 50 wt % to 80 wt %, and in this situation, the poly(vinylidene fluoride-co-hexafluoropropylene) and the lithium bis(trifluoromethanesulfonyl)imide are present in an amount ranging from 5 wt % to 44.9 wt %.

The solid-state electrolyte layer is formed by mixing the poly(vinylidene fluoride-co-hexafluoropropylene), lithium bis(trifluoromethanesulfonyl)imide, succinonitrile, and aluminum-doped lithium lanthanum zirconium oxide so as to obtain a mixture, and then subjecting the mixture to an extrusion process using a twin-screw extruder, but is not limited thereto.

<<First Cured Electrolyte Layer>>

In order to allow the first cured electrolyte layer to have good membrane-forming properties, good softness, good elasticity, good flexibility and good mechanical strength, and to allow the solid-state composite polymer electrolyte membrane to have good lithium ion conductivity, in certain embodiments, the acrylic material is present in an amount ranging from 10 wt % to 65 wt % based on 100 wt % of the first component. In certain embodiments, the acrylic material is ethoxylated trimethylolpropane triacrylate which is present in an amount ranging from 10 wt % to 65 wt % based on 100 wt % of the first component. When the ethoxylated trimethylolpropane triacrylate is present in an amount greater than 10 wt % based on 100 wt % of the first component, the first cured electrolyte layer has good membrane-forming properties and good mechanical strength. When the ethoxylated trimethylolpropane triacrylate is present in an amount less than 65 wt % based on 100 wt % of the first component, excessive degree of crosslinking of the ethoxylated trimethylolpropane triacrylate during the first polymerization reaction can be avoided, so that the first cured electrolyte layer has good softness, good elasticity and good flexibility, thereby allowing the solid-state composite polymer electrolyte membrane to have good lithium ion conductivity. In certain embodiments, the acrylic material is a combination of poly(ethylene glycol) dimethacrylate and poly(ethylene glycol) methacrylate, and based on 100 wt % of the first component, the poly(ethylene glycol) dimethacrylate is present in an amount ranging from 5 wt % to 50 wt % and the poly(ethylene glycol) methacrylate is present in an amount ranging from 5 wt % to 60 wt %. When the poly(ethylene glycol) dimethacrylate is present in an amount greater than 5 wt % based on 100 wt % of the first component, the first cured electrolyte layer has good membrane-forming properties and good mechanical strength. When the poly(ethylene glycol) dimethacrylate is present in an amount less than 50 wt % based on 100 wt % of the first component, excessive degree of crosslinking of the poly (ethylene glycol) dimethacrylate during the first polymerization reaction can be avoided, so that the first cured electrolyte layer has good softness, good elasticity and good flexibility, thereby allowing the solid-state composite polymer electrolyte membrane to have good lithium ion conductivity. When the poly(ethylene glycol) methacrylate is present in an amount greater than 5 wt % based on 100 wt % of the first component, the first cured electrolyte layer has good membrane-forming properties and good mechanical strength. When the poly(ethylene glycol) methacrylate is present in an amount less than 60 wt % based on 100 wt % of the first component, excessive degree of crosslinking of the poly(ethylene glycol) methacrylate during the first polymerization reaction can be avoided, so that the first cured electrolyte layer has good softness, good elasticity and good flexibility, thereby allowing the solid-state composite polymer electrolyte membrane to have good lithium ion conductivity.

In certain embodiments, the lithium bis(trifluoromethanesulfonyl)imide is present in an amount ranging from 5 wt % to 50 wt % based on 100 wt % of the first component. When the lithium bis(trifluoromethanesulfonyl)imide is present in an amount greater than 5 wt % based on 100 wt % of the first component, the solid-state composite polymer electrolyte membrane has good lithium ion conductivity. When the lithium bis(trifluoromethanesulfonyl)imide is present in an amount less than 50 wt % based on 100 wt % of the first component, the problem of lithium bis(trifluoromethanesulfonyl)imide cannot be completely dissolved due to its excessive amount can be avoided, and the problem of lithium bis(trifluoromethanesulfonyl)imide absorbing moisture to generate by-products, such as lithium hydroxide and lithium carbonate, which would adversely affect the lithium ion conductivity of the solid-state composite polymer electrolyte membrane, can also be avoided.

In order to allow the first cured electrolyte layer to have good softness, good elasticity, and good flexibility, and to allow the lithium bis(trifluoromethanesulfonyl)imide to dissociate so as to generate sufficient lithium ions, thereby improving the lithium ion conductivity of the solid-state composite polymer electrolyte membrane, in certain embodiments, the succinonitrile is present in an amount ranging from 5 wt % to 65 wt % based on 100 wt % of the first component.

In certain embodiments, the first initiator is a photoinitiator or a thermal initiator. Example of the photoinitiator includes, 2,2,-Dimethoxy-2-phenylacetophenone, but is not limited thereto. Example of the thermal initiator includes azobisisobutyronitrile, but is not limited thereto. In certain embodiments, the first initiator is present in an amount ranging from 0.5 parts by weight to 5 parts by weight based on 100 parts by weight of the acrylic material of the first component. When the first initiator is present in an amount greater than 0.5 parts by weight based on 100 parts by weight of the acrylic material of the first component, the first cured electrolyte layer has good membrane-forming properties. When the first initiator is present in an amount less than 5 parts by weight based on 100 parts by weight of the acrylic material of the first component, the first cured electrolyte layer has good flexibility and good mechanical strength, thereby allowing the solid-state composite polymer electrolyte membrane to have good lithium ion conductivity.

In order to allow the solid-state composite polymer electrolyte membrane to have good lithium ion conductivity and good thermal resistance, in certain embodiments, the first component further includes a ceramic filler material. Examples of the ceramic filler material include, but are not limited to, aluminum oxide particles, silicon dioxide particles, and aluminum oxide particles having surfaces coated with lithium-substituted poly(4-styrenesulfonic acid) (Li—PSS). The aluminum oxide particles having surfaces coated with lithium-substituted poly(4-styrenesulfonic acid) are obtained by subjecting a solution (adjust pH value of −7.0) containing a mixture of poly(4-styrenesulfonic acid) having an average molecular weight (Mw) of 75,000 (18 wt % in $H_2O$, commercially available from Sigma-Aldrich), lithium hydroxide monohydrate (LiOH $H_2O$, commercially available from Wako Pure Chemical Industries, Ltd.), aluminum oxide particles, and deionized water to a spray drying process. In certain embodiments, the ceramic filler material is selected from a group consisting of aluminum oxide particles, silicon dioxide particles, aluminum oxide particles having surfaces coated with lithium-substituted poly(4-styrenesulfonic acid) (Li—PSS), and combinations thereof. In certain embodiments, the ceramic filler material is present in an amount ranging from greater than 0 wt % to less than 10 wt % based on 100 wt % of the first component.

In certain embodiments, the first polymerization reaction is selected from a photopolymerization reaction that is performed by irradiating the first composition with an ultraviolet light and a thermal crosslinking polymerization reaction that is performed by heating the first composition. The ultraviolet light has a wavelength, e.g., 365 nm, but is not limited thereto. The ultraviolet light has an intensity, e.g., 30 $mW/cm^2$, but is not limited thereto. The photopolymerization reaction utilizing the ultraviolet light is performed for a time period ranging from 1 minute to 60 minutes. The thermal crosslinking polymerization reaction utilizing heat energy is performed for a time period ranging from 0.5 hours to 4 hours.

<<Second Cured Electrolyte Layer>>

In order to allow the solid-state composite polymer electrolyte membrane to have an improved lithium ion conductivity, in certain embodiments, the solid-state composite polymer electrolyte membrane further includes a second cured electrolyte layer such that the solid-state electrolyte layer is sandwiched between the first cured electrolyte layer and the second cured electrolyte layer. The second cured electrolyte layer is formed by subjecting a second composition including a second initiator and a second component that includes an acrylic material, lithium bis(trifluoromethanesulfonyl)imide and succinonitrile to a second polymerization reaction. The acrylic material of the second component is selected from the group consisting of ethoxylated trimethylolpropane triacrylate, poly(ethylene glycol) dimethacrylate, poly(ethylene glycol) methacrylate, and combinations thereof.

The acrylic material, the lithium bis(trifluoromethanesulfonyl)imide and the succinonitrile of the second component are similar to the acrylic material, the lithium bis(trifluoromethanesulfonyl)imide and the succinonitrile of the first component; and the second initiator is similar to the first initiator, and thus, details thereof are not provided herein for the sake of brevity.

In order to allow the solid-state composite polymer electrolyte membrane to have an improved lithium ion conductivity, in certain embodiments, the second component further includes a ceramic filler material. The ceramic filler material of the second component is similar to that of the first component, and thus, details thereof are not provided herein for the sake of brevity.

It should be noted that, the types and amounts of ingredients of the second component may be similar to or different from those of the first component.

The second polymerization reaction for forming the second cured electrolyte layer is the same as the first polymerization reaction for forming the first cured electrolyte layer, and thus, details thereof are not provided herein for the sake of brevity.

<<All-Solid-State Lithium Ion Battery>>

The present disclosure also provides an all-solid-state lithium ion battery including an anode (i.e., negative electrode), a cathode (i.e., positive electrode), and the above-mentioned solid-state composite polymer electrolyte membrane which is disposed between the anode and the cathode. That is, the anode and the cathode are disposed spaced apart from each other.

The cathode includes a collector layer (i.e., aluminum foil) and an electrode active layer disposed on the collector layer. The electrode active layer includes an cathode active material, a conductive agent, a binder, and lithium bis(trifluoromethanesulfonyl)imide. Examples of the cathode active material include, lithium nickel cobalt manganese oxide ($LiNi_{0.8}Co_{0.1}Mn_{0.1}O_2$, NCM811), lithium nickel cobalt aluminum oxide (NCA), and the like, but are not limited thereto. In certain embodiments, the cathode active material is lithium nickel cobalt manganese oxide or lithium nickel cobalt aluminum oxide. The conductive agent may be, e.g., conductive carbon black and the like, but is not limited thereto. In certain embodiments, the conductive agent is conductive carbon black. The binder may be, e.g., polyvinylidene fluoride, but is not limited thereto. In certain embodiments, the binder is polyvinylidene fluoride. In order to allow the electrode active layer to have improved electric conductivity, in certain embodiments, the electrode active layer further includes vapor-phase grown carbon fiber.

In certain embodiments, the cathode active material is present in an amount ranging from 70 wt % to 84 wt % based on 100 wt % of the electrode active layer. In certain embodiments, the conductive agent is present in an amount ranging from 5 wt % to 10 wt % based on 100 wt % of the electrode active layer. In certain embodiments, the binder is present in an amount ranging from 5 wt % to 10 wt % based on 100 wt % of the electrode active layer. In certain embodiments, the vapor-phase grown carbon fiber is present in an amount ranging from 0.1 wt % to 1.5 wt % based on 100 wt % of the electrode active layer. In certain embodiments, the lithium bis(trifluoromethanesulfonyl)imide is present in an amount ranging from 5 wt % to 19 wt % based on 100 wt % of the electrode active layer.

Examples of the anode include, lithium foil anode and lithium alloy anode, but are not limited thereto.

The all-solid-state lithium ion battery may be, e.g., coin cell-type all-solid-state lithium ion battery, but is not limited thereto. In certain embodiments, the all-solid-state lithium ion battery is coin cell-type all-solid-state lithium ion battery.

The present disclosure will be described by way of the following examples. However, it should be understood that the following examples are intended solely for the purpose of illustration and should not be construed as limiting the present disclosure in practice.

EXAMPLES

Preparation of Solid-State Composite Polymer Electrolyte Membrane

Example 1

In step (a), 23.81 wt % of poly(vinylidene fluoride-co-hexafluoropropylene) (abbreviated as PVDF-HFP) with an average molecular weight (Mw) of 400,000, 23.81 wt % of lithium bis(trifluoromethanesulfonyl)imide (abbreviated as LiTFSI), 2.38 wt % of succinonitrile (abbreviated as SN), and 50 wt % of aluminum-doped lithium lanthanum zirconium oxide (abbreviated as Al-LLZO) were placed in a twin screw extruder (Manufacturer: Xplore Instruments; Model No.: MC 15 HT), followed by a mixing treatment performed at 160° C. for 1 hour so as to obtain a mixture. Next, the mixture was subjected to a rolling treatment using the twin screw extruder set at a pressure of 100 kgf/cm² for 10 minutes, thereby obtaining a solid-state electrolyte layer that was solvent-free, in a disk shape, and that has a thickness of 400 μm.

In step (b), 19 wt % of ethoxylated trimethylolpropane triacrylate (abbreviated as ETPTA and serving as an acrylic material), 38 wt % of lithium bis(trifluoromethanesulfonyl) imide, and 43 wt % of succinonitrile were mixed, followed by stirring at 25° C. for 8 hours, so as to obtain a first component. Afterwards, the first component and 2,2,-Dimethoxy-2-phenylacetophenone (abbreviated as DMPA and serving as a photoinitiator) were mixed and stirred for 2 hours, thereby obtaining a first composition. The 2,2,-Dimethoxy-2-phenylacetophenone was present in an amount of 0.6 parts by weight based on 100 parts by weight (i.e., total weight) of the ethoxylated trimethylolpropane triacrylate of the first component.

In step (c), the first composition was coated on an upper surface of the solid-state electrolyte layer, and then was subjected to a photopolymerization reaction that is performed by irradiating the first composition with an ultraviolet light having a wavelength of 365 nm and an intensity of 30 mW/cm² under an argon atmosphere for 15 minutes, so as to form a first cured electrolyte layer on the solid-state electrolyte layer, thereby obtaining a solid-state composite polymer electrolyte membrane of Example 1.

Example 2

In step (a), 23.81 wt % of poly(vinylidene fluoride-co-hexafluoropropylene) with an average molecular weight (Mw) of 400,000, 23.81 wt % of lithium bis(trifluoromethanesulfonyl)imide, 2.38 wt % of succinonitrile, and 50 wt % of aluminum-doped lithium lanthanum zirconium oxide were placed in a twin screw extruder (Manufacturer: Xplore Instruments; Model No.: MC 15 HT), followed by a mixing treatment performed at 160° C. for 1 hour so as to obtain a mixture. Next, the mixture was subjected to a rolling treatment using the twin screw extruder set at a pressure of 100 kgf/cm² for 10 minutes, thereby obtaining a solid-state electrolyte layer that was solvent-free, in a disk shape, and that has a thickness of 400 μm.

In step (b), 19 wt % of ethoxylated trimethylolpropane triacrylate (serving as an acrylic material), 38 wt % of lithium bis(trifluoromethanesulfonyl)imide, and 43 wt % of succinonitrile were mixed, followed by stirring at 25° C. for 8 hours so as to obtain a first component. Afterwards, the first component and 2,2,-Dimethoxy-2-phenylacetophenone (serving as a photoinitiator) were mixed and stirred for 2 hours, thereby obtaining a first composition. The 2,2,-Dimethoxy-2-phenylacetophenone was present in an amount of 0.6 parts by weight based on 100 parts by weight (i.e., total weight) of the ethoxylated trimethylolpropane triacrylate of the first component.

In step (c), 19 wt % of ethoxylated trimethylolpropane triacrylate (serving as an acrylic material), 38 wt % of lithium bis(trifluoromethanesulfonyl)imide, and 43 wt % of succinonitrile were mixed, followed by stirring at 25° C. for 8 hours so as to obtain a second component. Afterwards, the second component and 2,2,-Dimethoxy-2-phenylacetophenone (serving as a photoinitiator) were mixed and stirred for 2 hours, thereby obtaining a second composition. The 2,2,-Dimethoxy-2-phenylacetophenone was present in an amount of 0.6 parts by weight based on 100 parts by weight (i.e., total weight) of the ethoxylated trimethylolpropane triacrylate of the second component.

In step (d), the first composition was coated on an upper surface of the solid-state electrolyte layer, and the second composition was coated on a lower surface of the solid-state electrolyte layer that is opposite to the upper surface, followed by a photopolymerization reaction that is performed by irradiating the upper surface coated with the first composition and the lower surface coated with the second composition with an ultraviolet light having a wavelength of 365 nm and an intensity of 30 mW/cm² under an argon atmosphere for 15 minutes, so as to form a first cured electrolyte layer and a second cured electrolyte layer, respectively, on the upper and lower surfaces of the solid-state electrolyte layer, thereby obtaining a solid-state composite polymer electrolyte membrane of Example 2.

Examples 3 to 5

The procedures and conditions for preparing solid-state composite polymer electrolyte membranes of Examples 3 to 5 were similar to those of Example 2, except that in the first component and the second component, certain ingredients and amounts thereof were altered (see Table 1 below). To be specific, in Examples 3 to 5, the first component further includes a ceramic filler material that is present in an amount of 1 wt % based on 100 wt % of the first component, and the second component further includes a ceramic filler material that is present in an amount of 1 wt % based on 100 wt % of the second component. The ceramic filler material may be aluminum oxide (Al₂O₃) particles, silicon dioxide (SiO₂) particles, or aluminum oxide (Al₂O₃) particles having surfaces coated with lithium-substituted poly(4-styrenesulfonic acid) (Li—PSS).

Example 6

The procedures and conditions for preparing a solid-state composite polymer electrolyte membrane of Example 6 were similar to those of Example 2 except for the following differences. In step (b), wt % of poly(ethylene glycol) dimethacrylate (abbreviated as PEGDMA and serving as an acrylic material), wt % of poly(ethylene glycol) methacrylate (abbreviated as PEGMA and serving as an acrylic material), 20 wt % of lithium bis(trifluoromethanesulfonyl) imide, and 40 wt % of succinonitrile were mixed by stirring at 25° C. for 8 hours so as to obtain a first component. Afterwards, the first component and 2,2,-Dimethoxy-2-phenylacetophenone were mixed and stirred for 2 hours, thereby obtaining a first composition. The 2,2,-Dimethoxy-2-phenylacetophenone was present in an amount of 1 part by weight based on 100 parts by weight (i.e., total weight) of the poly(ethylene glycol) dimethacrylate and the poly(ethylene glycol) methacrylate of the first component.

In step (c), 10 wt % of poly(ethylene glycol) dimethacrylate (serving as an acrylic material), 30 wt % of poly(ethylene glycol) methacrylate (serving as an acrylic material), 20 wt % of lithium bis(trifluoromethanesulfonyl)imide, and 40 wt % of succinonitrile were mixed by stirring at 25° C. for 8 hours so as to obtain a second component. Afterwards, the second component and 2,2,-Dimethoxy-2-phenylacetophenone were mixed and stirred for 2 hours, thereby obtaining a second composition. The 2,2,-Dimethoxy-2-phenylacetophenone was present in an amount of 1 part by weight based on 100 parts by weight (i.e., total weight) of the poly(ethylene glycol) dimethacrylate and the poly(ethylene glycol) methacrylate of the second component.

Examples 7 to 9

The procedures and conditions for preparing solid-state composite polymer electrolyte membranes of Examples 7 to 9 were similar to those of Example 6, except that in the first component and the second component, certain ingredients and amounts thereof were altered (see Table 1 below). To be specific, in Examples 7 to 9, the first component further includes a ceramic filler material that is present in an amount of 1 wt % based on 100 wt % of the first component, and the second component further includes a ceramic filler material that is present in an amount of 1 wt % based on 100 wt % of the second component. The ceramic filler material may be aluminum oxide ($Al_2O_3$) particles, silicon dioxide ($SiO_2$) particles, or aluminum oxide ($Al_2O_3$) particles having surfaces coated with lithium-substituted poly(4-styrenesulfonic acid) (Li—PSS).

Example 10

The procedures and conditions for preparing a solid-state composite polymer electrolyte membrane of Example 10 were similar to those of Example 2 except for the following differences. In step (b), the first component (i.e., the first component as in Example 2) and azobisisobutyronitrile (abbreviated as AIBN and serving as a first thermal initiator) were mixed and stirred for 2 hours, thereby obtaining a first composition. The azobisisobutyronitrile was present in an amount of 1.5 parts by weight based on 100 parts by weight (i.e., total weight) of the ethoxylated trimethylolpropane triacrylate of the first component.

In step (c), the second component (i.e., the second component as in Example 2) and azobisisobutyronitrile (serving as a second thermal initiator) were mixed and stirred for 2 hours, thereby obtaining a second composition. The azobisisobutyronitrile was present in an amount of 1.5 parts by weight based on 100 parts by weight (i.e., total weight) of the ethoxylated trimethylolpropane triacrylate of the second component.

In step (d), the first composition and the second composition were respectively coated on an upper surface and a lower surface of the solid-state electrolyte layer, followed by subjecting the upper surface coated with the first composition and the lower surface coated with the second composition to a thermal crosslinking polymerization reaction that is performed at 80° C. for 2 hours in an oven, so as to form a first cured electrolyte layer and a second cured electrolyte layer, respectively.

Examples 11 to 13

The procedures and conditions for preparing solid-state composite polymer electrolyte membranes of Examples 11 to 13 were similar to those of Example 10, except that in the first component and the second component, certain ingredients and amounts thereof were altered (see Table 2 below). To be specific, in Examples 11 to 13, the first component further includes a ceramic filler material that is present in an amount of 1 wt % based on 100 wt % of the first component, and the second component further includes a ceramic filler material that is present in an amount of 1 wt % based on 100 wt % of the second component. The ceramic filler material may be aluminum oxide ($Al_2O_3$) particles, silicon dioxide ($SiO_2$) particles, or aluminum oxide ($Al_2O_3$) particles having surfaces coated with lithium-substituted poly(4-styrenesulfonic acid) (Li—PSS).

Example 14

The procedures and conditions for preparing a solid-state composite polymer electrolyte membrane of Example 14 were similar to those of Example 10, except for the following differences. In step (b), 10 wt % of poly(ethylene glycol) dimethacrylate (serving as an acrylic material), 30 wt % of poly(ethylene glycol) methacrylate (serving as an acrylic material), 20 wt % of lithium bis(trifluoromethanesulfonyl) imide, and 40 wt % of succinonitrile were mixed by stirring at 25° C. for 8 hours, so as to obtain a first component. Afterwards, the first component and azobisisobutyronitrile were mixed and stirred for 2 hours, thereby obtaining a first composition. The azobisisobutyronitrile was present in an amount of 1.5 parts by weight based on 100 parts by weight (i.e., total weight) of the poly(ethylene glycol) dimethacrylate and the poly(ethylene glycol) methacrylate of the first component.

In step (c), 10 wt % of poly(ethylene glycol) dimethacrylate (serving as an acrylic material), 30 wt % of poly(ethylene glycol) methacrylate (serving as an acrylic material), 20 wt % of lithium bis(trifluoromethanesulfonyl)imide, and 40 wt % of succinonitrile were mixed by stirring at 25° C. for 8 hours, so as to obtain a second component. Afterwards, the second component and azobisisobutyronitrile were mixed and stirred for 2 hours, thereby obtaining a second composition. The azobisisobutyronitrile was present in an amount of 1.5 parts by weight based on 100 parts by weight (i.e., total weight) of the poly(ethylene glycol) dimethacrylate and the poly(ethylene glycol) methacrylate of the second component.

Examples 15 to 17

The procedures and conditions for preparing solid-state composite polymer electrolyte membranes of Examples 15 to 17 were similar to those of Example 14, except that in the first component and the second component, certain ingredients and amounts thereof were altered (see Table 2 below). To be specific, in Examples 15 to 17, the first component further includes a ceramic filler material that is present in an amount of 1 wt % based on 100 wt % of the first component, and the second component further includes a ceramic filler material that is present in an amount of 1 wt % based on 100 wt % of the second component. The ceramic filler material may be aluminum oxide ($Al_2O_3$) particles, silicon dioxide ($SiO_2$) particles, or aluminum oxide ($Al_2O_3$) particles having surfaces coated with lithium-substituted poly(4-styrene-sulfonic acid) (Li—PSS).

Comparative Example 1

First, 23.81 wt % of poly(vinylidene fluoride-co-hexafluoropropylene) with an average molecular weight (Mw) of 400,000, 23.81 wt % of lithium bis(trifluoromethanesulfonyl)imide, 2.38 wt % of succinonitrile, and 50 wt % of aluminum-doped lithium lanthanum zirconium oxide were placed in a twin screw extruder (Manufacturer: Xplore Instruments; Model No.: MC 15 HT), followed by a mixing treatment performed at 160° C. for 1 hour so as to obtain a mixture. Next, the mixture was subjected to a rolling treatment using the twin screw extruder set at a pressure of 100 kgf/cm² for 10 minutes, thereby obtaining a solid-state electrolyte layer that was solvent-free, in a disk shape, and that has a thickness of 480 μm.

Comparative Example 2

First, 19 wt % of ethoxylated trimethylolpropane triacrylate (serving as an acrylic material), 38 wt % of lithium bis(trifluoromethanesulfonyl)imide, and 43 wt % of succinonitrile were mixed by stirring at 25° C. for 8 hours, so as to obtain a raw material component. Afterwards, the raw material component and 2,2,-Dimethoxy-2-phenylacetophenone (serving as a photoinitiator) were mixed and stirred for 2 hours, thereby obtaining a mixture. The 2,2,-Dimethoxy-2-phenylacetophenone was present in an amount of 0.6 parts by weight based on 100 parts by weight (i.e., total weight) of the ethoxylated trimethylolpropane triacrylate of the raw material component.

Thereafter, the mixture was coated on a surface of a commercially available polyethylene terephthalate sheet having a thickness of 90 μm, followed by a photopolymerization reaction that is performed by irradiating the surface coated with the mixture with an ultraviolet light having a wavelength of 365 nm and an intensity of 30 mW/cm² under an argon atmosphere for 15 minutes, so as to form a cured electrolyte membrane of Comparative Example 2.

Measurement of Lithium Ion Conductivity

Each of the electrolyte membranes of Examples 1 to 17 and Comparative Examples 1 and 2 was subjected to measurement of bulk resistance (Rb) using a potentiostat/galvanostat instrument equipped with frequency response analyzer (FRA) (Manufacturer: Bio-Logic Science Instruments; Model No.: SP-300) at a temperature of 25° C., a frequency ranging from 1 MHz to 100 mHz, and an amplitude of 10 mV. The lithium ionic conductivity (al) of each of the electrolyte membranes was calculated based on the thickness, area and bulk resistance thereof using the following Equation (I):

$$\text{Lithium ionic conductivity}(\sigma_i)(10^{-4}\ S/cm)=(A+B)\times C \qquad (I)$$

in which
A=thickness of the electrolyte membrane
B=bulk resistance (Rb) of the electrolyte membrane
C=area of the electrolyte membrane
The results are shown in Table 3 below.

TABLE 1

| | Amount (wt %) | Example | | | | | | | | | |
|---|---|---|---|---|---|---|---|---|---|---|---|
| | | 1 | 2 | 3 | 4 | 5 | 6 | 7 | 8 | 9 | 10 |
| Solid-state electrolyte layer | PVDF-HFP | 23.81 | 23.81 | 23.81 | 23.81 | 23.81 | 23.81 | 23.81 | 23.81 | 23.81 | 23.81 |
| | LiTFSI | 23.81 | 23.81 | 23.81 | 23.81 | 23.81 | 23.81 | 23.81 | 23.81 | 23.81 | 23.81 |
| | SN | 2.38 | 2.38 | 2.38 | 2.38 | 2.38 | 2.38 | 2.38 | 2.38 | 2.38 | 2.38 |
| | Al-LLZO | 50 | 50 | 50 | 50 | 50 | 50 | 50 | 50 | 50 | 50 |
| First cured electrolyte layer | ETPTA | 19 | 19 | 19 | 19 | 19 | — | — | — | — | 19 |
| | PEGDMA | — | — | — | — | — | 10 | 10 | 10 | 10 | — |
| | PEGMA | — | — | — | — | — | 30 | 30 | 30 | 30 | — |
| | LiTFSI | 38 | 38 | 38 | 38 | 38 | 20 | 20 | 20 | 20 | 38 |
| | SN | 43 | 43 | 42 | 42 | 42 | 40 | 39 | 39 | 39 | 43 |
| | $Al_2O_3$ | — | — | — | 1 | — | — | — | 1 | — | — |
| | $SiO_2$ | — | — | — | — | 1 | — | — | — | 1 | — |
| | $Al_2O_3$ coated with LiPSs | — | — | 1 | — | — | — | 1 | — | — | — |
| | DMPA (parts by weight) | 0.6 | 0.6 | 0.6 | 0.6 | 0.6 | 1 | 1 | 1 | 1 | — |
| | AlBN (parts by weight) | — | — | — | — | — | — | — | — | — | 1.5 |
| Second cured electrolyte layer | ETPTA | — | 19 | 19 | 19 | 19 | — | — | — | — | 19 |
| | PEGDMA | — | — | — | — | — | 10 | 10 | 10 | 10 | — |
| | PEGMA | — | — | — | — | — | 30 | 30 | 30 | 30 | — |
| | LiTFSI | — | 38 | 38 | 38 | 38 | 20 | 20 | 20 | 20 | 38 |
| | SN | — | 43 | 42 | 42 | 42 | 40 | 39 | 39 | 39 | 43 |
| | $Al_2O_3$ | — | — | — | 1 | — | — | — | 1 | — | — |
| | $SiO_2$ | — | — | — | — | 1 | — | — | — | 1 | — |
| | $Al_2O_3$ coated with LiPSs | — | — | 1 | — | — | — | 1 | — | — | — |
| | DMPA (parts by weight) | — | 0.6 | 0.6 | 0.6 | 0.6 | 1 | 1 | 1 | 1 | — |
| | AlBN (parts by weight) | — | — | — | — | — | — | — | — | — | 1.5 |

TABLE 2

| Amount (wt %) | | Example | | | | | | | Comparative Example | |
|---|---|---|---|---|---|---|---|---|---|---|
| | | 11 | 12 | 13 | 14 | 15 | 16 | 17 | 1 | 2 |
| Solid-state electrolyte layer | PVDF-HFP | 23.81 | 23.81 | 23.81 | 23.81 | 23.81 | 23.81 | 23.81 | 23.81 | — |
| | LiTFSl | 23.81 | 23.81 | 23.81 | 23.81 | 23.81 | 23.81 | 23.81 | 23.81 | — |
| | SN | 2.38 | 2.38 | 2.38 | 2.38 | 2.38 | 2.38 | 2.38 | 2.38 | — |
| | Al-LLZO | 50 | 50 | 50 | 50 | 50 | 50 | 50 | 50 | — |
| First cured electrolyte layer | ETPTA | 19 | 19 | 19 | — | — | — | — | — | 19 |
| | PEGDMA | — | — | — | 10 | 10 | 10 | 10 | — | — |
| | PEGMA | — | — | — | 30 | 30 | 30 | 30 | — | — |
| | LiTFSl | 38 | 38 | 38 | 20 | 20 | 20 | 20 | — | 38 |
| | SN | 42 | 42 | 42 | 40 | 39 | 39 | 39 | — | 43 |
| | $Al_2O_3$ | — | 1 | — | — | — | 1 | — | — | — |
| | $SiO_2$ | — | — | 1 | — | — | — | 1 | — | — |
| | $Al_2O_3$ coated with LiPSs | 1 | — | — | — | 1 | — | — | — | — |
| | DMPA (parts by weight) | | | | | | | | | 0.6 |
| | AlBN (parts by weight) | 1.5 | 1.5 | 1.5 | 1.5 | 1.5 | 1.5 | 1.5 | — | — |
| Second cured electrolyte layer | ETPTA | 19 | 19 | 19 | — | — | — | — | — | — |
| | PEGDMA | — | — | — | 10 | 10 | 10 | 10 | — | — |
| | PEGMA | — | — | — | 30 | 30 | 30 | 30 | — | — |
| | LiTFSl | 38 | 38 | 38 | 20 | 20 | 20 | 20 | — | — |
| | SN | 42 | 42 | 42 | 40 | 39 | 39 | 39 | — | — |
| | $Al_2O_3$ | — | 1 | — | — | — | 1 | — | — | — |
| | $SiO_2$ | — | — | 1 | — | — | — | 1 | — | — |
| | $Al_2O_3$ coated with LiPSs | 1 | — | — | — | 1 | — | — | — | — |
| | AlBN (parts by weight) | 1.5 | 1.5 | 1.5 | 1.5 | 1.5 | 1.5 | 1.5 | — | — |

TABLE 3

| | | $R_b$ (Ohm) | Thickness (cm) | Area ($cm^2$) | Lithium ionic conductivity ($\sigma_i$) ($10^{-4}$ S/cm) |
|---|---|---|---|---|---|
| Example | 1 | 215.6 | 0.0499 | 1.27 | 1.82 |
| | 2 | 102.3 | 0.0498 | 1.27 | 3.83 |
| | 3 | 73.8 | 0.0496 | 1.27 | 5.29 |
| | 4 | 198.2 | 0.0495 | 1.27 | 1.97 |
| | 5 | 211.6 | 0.0496 | 1.27 | 1.85 |
| | 6 | 153.8 | 0.0490 | 1.27 | 2.51 |
| | 7 | 110.8 | 0.0494 | 1.27 | 3.51 |
| | 8 | 263.1 | 0.0497 | 1.27 | 1.49 |
| | 9 | 284.0 | 0.0491 | 1.27 | 1.36 |
| | 10 | 161.6 | 0.0497 | 1.27 | 2.42 |
| | 11 | 186.1 | 0.0498 | 1.27 | 2.11 |
| | 12 | 225.9 | 0.0492 | 1.27 | 1.71 |
| | 13 | 265.0 | 0.0492 | 1.27 | 1.46 |
| | 14 | 175.2 | 0.0493 | 1.27 | 2.22 |
| | 15 | 246.5 | 0.0490 | 1.27 | 1.57 |
| | 16 | 303.0 | 0.0495 | 1.27 | 1.29 |
| | 17 | 100.8 | 0.0498 | 1.27 | 0.98 |
| Comparative Example | 1 | 480.0 | 0.0480 | 1.27 | 0.79 |
| | 2 | 51.2 | 0.0057 | 1.27 | 0.88 |

Referring to Table 3, with the electrolyte membranes of Examples 1 to 17 including the solid-state electrolyte layers, the first cured electrolyte layers, and second cured electrolyte layers having the compositions as shown in Tables 1 and 2, the electrolyte membranes of Examples 1 to 17 have lithium ionic conductivities ranging from $0.98 \times 10^{-4}$ S/cm to $3.83 \times 10^{-4}$ S/cm.

In contrast, the electrolyte membrane of Comparative Example 1 has a poor lithium ion conductivity due to the absence of a cured electrolyte layer; and the electrolyte membrane of Comparative Example 2 also has a poor lithium ion conductivity due to the absence of a solid-state electrolyte layer. It is worth mentioning that, in comparison with the lithium ionic conductivities of Comparative Examples 1 and 2, the lithium ionic conductivities of the solid-state composite polymer electrolyte membranes of Examples 1 to 17 increase by 11.4% [i.e., $(0.98-0.88)/0.88 \times 100\%$] to 569.6% [i.e., $(5.29-0.79)/0.79 \times 100\%$], indicating that the solid-state composite polymer electrolyte membranes of Examples 1 to 17 indeed can effectively improve the problem of poor lithium ionic conductivity of a conventional polymer electrolyte membrane.

Preparation of all-Solid-State Lithium Ion Battery

Application Example 1

In step (a), 75 wt % of lithium nickel cobalt manganese oxide ($LiNi_{0.8}Co_{0.1}Mn_{0.1}O_2$), i.e., NCM811 coated with $Al_2O_3$ that is carbon-coated (0.00378 g; serving as an cathode active material), 10 wt % of conductive carbon black (Manufacturer: Timcal Ltd.; Model No.: Super P®-Li; serving as a conductive agent), 9 wt % of polyvinylidene fluoride (serving as a binder), 1 wt % of vapor grown carbon fiber, and 5 wt % of lithium bis(trifluoromethanesulfonyl) imide were mixed, followed by dispersion in dimethylformamide, thereby obtaining a mixture. Next, the mixture was subjected to a ball-milling treatment using a ball mill (Manufacturer: Fritsch Pulverisette 7) with agate balls at a speed of 400 rpm for 2 hours, so as to obtain a slurry component. Afterwards, the slurry component was coated on a surface of an aluminum foil (serving as a collector layer). Thereafter, the aluminum foil coated with the slurry component was subjected to a vacuum-drying treatment at 60° C., and then heated at 120° C. for 12 hours to remove the dimethylformamide, followed by rolling and cutting treatments using a roller press (Manufacturer: Lemon-One Industrial Co., Ltd.; Model: LR-3020), thereby obtaining an cathode that is disc-shaped, has a diameter of 1.3 cm, and includes the aluminum foil and an electrode active layer formed on the aluminum foil. In addition, a load capacity of the cathode active material of the cathode is 2.8 mg/cm². The aforesaid NCM811 coated with $Al_2O_3$ that is carbon-coated refers to surfaces of the NCM811 which was coated with the $Al_2O_3$ that is carbon-coated by a mechanofusion technique. The aforesaid $Al_2O_3$ that is carbon-coated refers to aluminum oxide ($Al_2O_3$) particles having surfaces coated with carbon, and was obtained by subjecting a mixed solution containing sucrose, aluminum oxide ($Al_2O_3$) particles, and deionized water to a spray-drying treatment so as to obtain the aluminum oxide ($Al_2O_3$) particles having surfaces coated with the sucrose, followed by subjecting the aluminum oxide ($Al_2O_3$) particles having surfaces coated with the sucrose to a calcination treatment.

In step (b), the cathode, the solid-state composite polymer electrolyte membrane of Example 2, and a lithium foil anode were assembled into a CR2032 Coin Cell battery under an argon atmosphere. After that, the CR2032 Coin Cell battery was left to stand for one day at 25° C., thereby forming an all-solid-state lithium ion battery of Application Example 1 which has an open circuit voltage of 3.2 V.

Application Example 2

The procedures and conditions for preparing an all-solid-state lithium ion battery of Application Example 2 were similar to that of Application Example 1 except for the following differences. In step (a), lithium nickel cobalt aluminum oxide, i.e., NCA coated with $Al_2O_3$ that is carbon-coated, serves as a cathode active material, and is present in an amount of 0.00462 g. The weight percentages of the cathode active material, conductive carbon black, polyvinylidene fluoride, vapor grown carbon fiber, and lithium bis(trifluoromethanesulfonyl)imide were similar to those described in Application Example 1. In addition, the load capacity of the cathode active material is 6.26 mg/cm². The aforesaid NCA coated with $Al_2O_3$ that is carbon-coated refers to surfaces of the NCA which are coated with the $Al_2O_3$ that is carbon-coated by the mechanofusion technique. The $Al_2O_3$ is similar to that described in Application Example 1 above, and thus, details thereof are not provided herein.

Application Example 3

The procedures and conditions for preparing an all-solid-state lithium ion battery of Application Example 3 were similar to those of Application Example 1 except for the following differences. In step (a), the cathode active material is present in an amount of 0.00401 g, and the load capacity of the cathode active material is 5.94 mg/cm². The weight percentages of the cathode active material, conductive carbon black, polyvinylidene fluoride, vapor grown carbon fiber, and lithium bis(trifluoromethanesulfonyl)imide were similar to those described in Application Example 1. In step (b), the solid-state composite polymer electrolyte membrane of Example 2 was replaced with the solid-state composite polymer electrolyte membrane of Example 7.

Application Example 4

The procedures and conditions for preparing an all-solid-state lithium ion battery of Application Example 4 were similar to those of Application Example 2 except for the following differences. In step (a), the cathode active material is present in an amount of 0.00401 g, and the load capacity of the cathode active material is 5.94 mg/cm². The weight percentages of the cathode active material, conductive carbon black, polyvinylidene fluoride, vapor grown carbon fiber, and lithium bis(trifluoromethanesulfonyl)imide were similar to those described in Application Example 1. In step (b), the solid-state composite polymer electrolyte membrane of Example 2 was replaced with the solid-state composite polymer electrolyte membrane of Example 7.

Application Example 5

The procedures and conditions for preparing an all-solid-state lithium ion battery of Application Example 5 were similar to those of Application Example 1 except for the following differences. In step (a), the cathode active material is present in an amount of 0.00462 g, and the load capacity of the cathode active material is 6.26 mg/cm². The weight percentages of the cathode active material, conductive carbon black, polyvinylidene fluoride, vapor grown carbon fiber, and lithium bis(trifluoromethanesulfonyl)imide were similar to those described in Application Example 1. In step (b), the solid-state composite polymer electrolyte membrane of Example 2 was replaced with the solid-state composite polymer electrolyte membrane of Example 11.

Measurement of Electrochemical Properties

A respective one of the all-solid-state lithium ion batteries of Application Examples 1 to 5 was subjected to measurement of reversible specific capacity ($Q_{sp}$) (i.e., reversible specific charge/discharge capacity) which was performed using a battery automation test system (Manufacturer: AcuTech Systems Co., Ltd.; Model No.: BAT-705B) at an ambient temperature of 25° C., a charge current rate of 0.1 C; a discharge current rate of 0.1 C, and a cut-off voltage ranging from 2.8 V to 4.2 V and/or 2.8 V to 4.3 V, for 3, 5 or 30 charge/discharge cycles. To be specific, the all-solid-state lithium ion battery of Application Example 1 was subjected to 3 charge/discharge cycles at cut-off voltage ranging from 2.8 V to 4.2 V and cut-off voltage ranging from 2.8 V to 4.3 V (see Table 4); the all-solid-state lithium ion battery of Application Example 2 was subjected to 5 charge/discharge cycles at cut-off voltage ranging from 2.8 V to 4.2 V and cut-off voltage ranging from 2.8 V to 4.3 V (see Table 5); the all-solid-state lithium ion batteries of Application Examples 3 and 4 were subjected to 5 charge/discharge cycles at cut-off voltage ranging from 2.8 V to 4.2 V and 3 charge/discharge cycles at cut-off voltage ranging from 2.8 V to 4.3 V (see Tables 6 and 7); and the all-solid-state lithium ion battery of Application Example 5 was subjected to 30 charge/discharge cycles at cut-off voltage ranging from 2.8 V to 4.3 V (see Table 8). The charge capacity and discharge capacity of each cycle were recorded. Then, a coulombic efficiency (CE) of each of the all-solid-state lithium ion batteries in each charge/discharge cycle was calculated based on the aforesaid reversible specific charge capacity and reversible specific discharge capacity thereof using the following Equation (II):

$$\text{Coulombic efficiency}(CE)(\%)=(D \div E) \times 100\% \tag{II}$$

in which
   D=reversible specific discharge capacity
   E=reversible specific charge capacity
   In addition, a specific discharge capacity of each of the all-solid-state lithium ion batteries was calculated based on the discharge capacity and the weight of cathode active material thereof using the following Equation (III):

$$\text{Specific discharge capacity}(\text{mAh/g})=F \div G \tag{III}$$

in which
   F=discharge capacity
   G=weight of cathode active material

TABLE 4

| Application Example 1 (charge current rate: 0.1 C; discharge current rate: 0.1 C) | | | | | |
|---|---|---|---|---|---|
| Cut-off voltage range | Number of charge/discharge cycle | Charge capacity (mAh) | Discharge capacity (mAh) | Coulombic efficiency (%) | Specific discharge capacity (mAh/g) |
| 2.8 V to 4.2 V | 1 | 0.513 | 0.432 | 84.21 | 114.29 |
| | 2 | 0.469 | 0.433 | 92.32 | 114.55 |
| | 3 | 0.439 | 0.420 | 95.67 | 111.11 |
| 2.8 V to 4.3 V | 1 | 0.476 | 0.488 | 102.52 | 129.10 |
| | 2 | 0.579 | 0.592 | 102.25 | 156.61 |
| | 3 | 0.518 | 0.510 | 98.46 | 134.92 |

TABLE 5

| Application Example 2 (charge current rate: 0.1 C; discharge current rate: 0.1 C) | | | | | |
|---|---|---|---|---|---|
| Cut-off voltage range | Number of charge/discharge cycle | Charge capacity (mAh) | Discharge capacity (mAh) | Coulombic efficiency (%) | Specific discharge capacity (mAh/g) |
| 2.8 V to 4.2 V | 1 | 0.686 | 0.591 | 86.15 | 127.92 |
| | 2 | 0.636 | 0.630 | 99.06 | 136.36 |
| | 3 | 0.639 | 0.627 | 98.12 | 135.71 |
| | 4 | 0.632 | 0.619 | 97.94 | 133.98 |
| | 5 | 0.634 | 0.633 | 99.84 | 137.01 |
| 2.8 V to 4.3 V | 1 | 0.542 | 0.517 | 95.39 | 111.90 |
| | 2 | 0.608 | 0.612 | 100.66 | 132.47 |
| | 3 | 0.671 | 0.672 | 100.15 | 145.45 |
| | 4 | 0.678 | 0.678 | 100.00 | 146.75 |
| | 5 | 0.694 | 0.685 | 98.70 | 148.27 |

TABLE 6

| Application Example 3 (charge current rate: 0.1 C; discharge current rate: 0.1 C) | | | | | |
|---|---|---|---|---|---|
| Cut-off voltage range | Number of charge/discharge cycle | Charge capacity (mAh) | Discharge capacity (mAh) | Coulombic efficiency (%) | Specific discharge capacity (mAh/g) |
| 2.8 V to 4.2 V | 1 | 0.585 | 0.508 | 86.84 | 126.68 |
| | 2 | 0.512 | 0.500 | 97.66 | 124.68 |
| | 3 | 0.513 | 0.496 | 96.69 | 123.69 |
| | 4 | 0.507 | 0.491 | 96.84 | 122.44 |
| | 5 | 0.507 | 0.493 | 97.24 | 122.94 |
| 2.8 V to 4.3 V | 1 | 0.491 | 0.467 | 95.11 | 116.46 |
| | 2 | 0.545 | 0.524 | 96.15 | 130.67 |
| | 3 | 0.564 | 0.543 | 96.28 | 135.41 |

TABLE 7

| Application Example 4 (charge current rate: 0.1 C; discharge current rate: 0.1 C) | | | | | |
|---|---|---|---|---|---|
| Cut-off voltage range | Number of charge/discharge cycle | Charge capacity (mAh) | Discharge capacity (mAh) | Coulombic efficiency (%) | Specific discharge capacity (mAh/g) |
| 2.8 V to 4.2 V | 1 | 0.597 | 0.509 | 85.26 | 126.93 |
| | 2 | 0.520 | 0.510 | 98.08 | 127.18 |
| | 3 | 0.523 | 0.507 | 96.94 | 126.43 |
| | 4 | 0.515 | 0.497 | 96.50 | 123.94 |
| | 5 | 0.517 | 0.502 | 97.10 | 125.19 |

TABLE 7-continued

Application Example 4 (charge current rate: 0.1 C; discharge current rate: 0.1 C)

| Cut-off voltage range | Number of charge/discharge cycle | Charge capacity (mAh) | Discharge capacity (mAh) | Coulombic efficiency (%) | Specific discharge capacity (mAh/g) |
|---|---|---|---|---|---|
| 2.8 V to 4.3 V | 1 | 0.568 | 0.540 | 95.07 | 134.66 |
| | 2 | 0.587 | 0.565 | 96.25 | 140.90 |
| | 3 | 0.587 | 0.564 | 96.08 | 140.65 |

TABLE 8

Application Example 5 (charge current rate: 0.1 C; discharge current rate: 0.1 C)

| Cut-off voltage range | Number of charge/discharge cycle | Charge capacity (mAh) | Discharge capacity (mAh) | Coulombic efficiency (%) | Specific discharge capacity (mAh/g) |
|---|---|---|---|---|---|
| 2.8 V to 4.3 V | 1 | 0.513 | 0.432 | 84.21 | 93.51 |
| | 2 | 0.469 | 0.433 | 92.32 | 93.72 |
| | 3 | 0.439 | 0.420 | 95.67 | 90.91 |
| | 4 | 0.434 | 0.459 | 105.76 | 99.35 |
| | 5 | 0.476 | 0.488 | 102.52 | 105.63 |
| | 10 | 0.579 | 0.592 | 102.25 | 128.14 |
| | 20 | 0.513 | 0.508 | 99.03 | 109.96 |
| | 30 | 0.524 | 0.519 | 99.05 | 112.34 |

Referring to Tables 4 to 7, each of the all-solid-state lithium ion batteries of Application Examples 1 to 5, which includes the solid-state composite polymer electrolyte membrane of the present disclosure, has good coulombic efficiency and specific discharge capacity under the cut-off voltage ranging from 2.8 V to 4.3 V. It is worth mentioning that, for each of the all-solid-state lithium ion batteries of Application Examples 1 to 5, an average specific discharge capacity under the cut-off voltage ranging from 2.8 V to 4.3 V is greater than that under the cut-off voltage ranging of 2.8 V to 4.2 V, indicating that the all-solid-state lithium ion battery of the present disclosure has good lifespan.

Referring to Table 8, after 10 charge/discharge cycles, the all-solid-state lithium ion battery of Application Example 5 is fully activated and has the highest specific discharge capacity; and after 30 charge/discharge cycles, the all-solid-state lithium ion battery of Application Example 5 has a capacity retention (CR) of 87.66% (i.e., percentage of the specific discharge capacity after 30 charge/discharge cycles in comparison with the specific discharge capacity after 10 charge/discharge cycles), indicating that the all-solid-state lithium ion battery including the solid-state composite polymer electrolyte membranes of the present disclosure has a relatively long service life.

In summary, by including the solid-state electrolyte layer and the cured electrolyte layer, the solid-state composite polymer electrolyte membrane of the present disclosure exhibits a high lithium ion conductivity at 25° C.; and in comparison with the lithium ion conductivity of a single solid-state electrolyte layer or that of a single cured electrolyte layer, the lithium ion conductivity of the solid-state composite polymer electrolyte membrane of the present disclosure increases by 47% to 336.7%. In addition, by including the solid-state composite polymer electrolyte membrane, the all-solid-state lithium ion battery of the present disclosure has a high specific discharge capacity under a high voltage charge.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A solid-state composite polymer electrolyte membrane, comprising:

a solid-state electrolyte layer including poly(vinylidene fluoride-co-hexafluoropropylene), lithium bis(trifluoromethanesulfonyl)imide, succinonitrile, and aluminum-doped lithium lanthanum zirconium oxide, said aluminum-doped lithium lanthanum zirconium oxide being present in an amount ranging from 50 wt % to 80 wt % based on 100 wt % of said solid-state electrolyte layer; and a first cured electrolyte layer which is disposed on said solid-state electrolyte layer and which is formed by subjecting a first composition including a first initiator and a first component that includes an acrylic material, lithium bis(trifluoromethanesulfonyl)imide and succinonitrile to a first polymerization reaction, said acrylic material being selected from the group consisting of ethoxylated trimethylolpropane triacrylate, poly(ethylene glycol) dimethacrylate, poly(ethylene glycol) methacrylate, and combinations thereof.

2. The solid-state composite polymer electrolyte membrane as claimed in claim 1, further comprising a second cured electrolyte layer such that said solid-state electrolyte layer is sandwiched between said first cured electrolyte layer and said second cured electrolyte layer, said second cured electrolyte layer being formed by subjecting a second composition including a second initiator and a second component that includes an acrylic material, lithium bis(trifluoromethanesulfonyl)imide and succinonitrile to a second polymerization reaction, said acrylic material being selected from the group consisting of ethoxylated trimethylolpropane triacrylate, poly(ethylene glycol) dimethacrylate, poly(ethylene glycol) methacrylate, and combinations thereof.

3. The solid-state composite polymer electrolyte membrane as claimed in claim 2, wherein said second component further includes a ceramic filler material.

4. The solid-state composite polymer electrolyte membrane as claimed in claim 3, wherein said ceramic filler material is selected from a group consisting of aluminum oxide particles, silicon dioxide particles, aluminum oxide particles having surfaces coated with lithium-substituted poly(4-styrenesulfonic acid), and combinations thereof.

5. The solid-state composite polymer electrolyte membrane as claimed in claim 2, wherein said second polymerization reaction is a photopolymerization reaction that is performed by irradiating said second composition with an ultraviolet light for a time period ranging from 1 minute to 60 minutes.

6. The solid-state composite polymer electrolyte membrane as claimed in claim 2, wherein said second polymerization reaction is a thermal crosslinking polymerization reaction that is performed by heating said second composition at 80° C. for a time period ranging from 0.5 hours to 4 hours.

7. The solid-state composite polymer electrolyte membrane as claimed in claim 1, wherein said first component further includes a ceramic filler material.

8. The solid-state composite polymer electrolyte membrane as claimed in claim 7, wherein said ceramic filler material is selected from a group consisting of aluminum oxide particles, silicon dioxide particles, aluminum oxide particles having surfaces coated with lithium-substituted poly(4-styrenesulfonic acid), and combinations thereof.

9. The solid-state composite polymer electrolyte membrane as claimed in claim 1, wherein said first polymerization reaction is a photopolymerization reaction that is performed by irradiating said first composition with an ultraviolet light for a time period ranging from 1 minute to 60 minutes.

10. The solid-state composite polymer electrolyte membrane as claimed in claim 1, wherein said first polymerization reaction is a thermal crosslinking polymerization reaction that is performed by heating said first composition at 80° C. for a time period ranging from 0.5 hours to 4 hours.

11. An all-solid-state lithium ion battery, comprising:

an anode;

a cathode; and a solid-state composite polymer electrolyte membrane as claimed in claim 1 which is disposed between said anode and said cathode.

* * * * *